US012730332B2

(12) United States Patent
Wu et al.

(10) Patent No.: US 12,730,332 B2
(45) Date of Patent: Sep. 8, 2026

(54) OPTICAL SYSTEM

(71) Applicant: Actutek Corporation, Taoyuan City (TW)

(72) Inventors: Chia-Che Wu, Taoyuan City (TW); Chao-Chang Hu, Taoyuan City (TW); Yung-Hsien Yeh, Taoyuan City (TW); Chih-Wei Weng, Taoyuan City (TW); Chih-Wen Chiang, Taoyuan City (TW); Yu-Chiao Lo, Taoyuan City (TW); Sin-Jhong Song, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 276 days.

(21) Appl. No.: 18/521,717

(22) Filed: Nov. 28, 2023

(65) Prior Publication Data

US 2024/0176094 A1 May 30, 2024

Related U.S. Application Data

(60) Provisional application No. 63/428,238, filed on Nov. 28, 2022.

(51) Int. Cl.

| | |
|---|---|
| ***G02B 27/64*** | (2006.01) |
| ***G02B 7/02*** | (2021.01) |
| ***G02B 7/08*** | (2021.01) |
| ***G02B 7/09*** | (2021.01) |
| ***G03B 3/10*** | (2021.01) |

(Continued)

(52) U.S. Cl.
CPC ............ *G02B 27/646* (2013.01); *G02B 7/02* (2013.01); *G02B 7/08* (2013.01); *G02B 7/09* (2013.01); *G02B 27/64* (2013.01); *G03B 3/10* (2013.01); *G03B 13/34* (2013.01); *G03B 13/36* (2013.01);

(Continued)

(58) Field of Classification Search
CPC .......... G02B 27/646; G02B 7/02; G02B 7/08; G02B 7/09; G02B 13/0065; G02B 27/64; G03B 13/36; G03B 3/10; G03B 5/00; G03B 30/00; G03B 13/34; H02K 33/00;

(Continued)

(56) References Cited

U.S. PATENT DOCUMENTS 8,590 A * 12/1851 Lewis ...................... G02B 7/04 396/89
208,956 A * 10/1878 Cadett ...................... G03B 9/58 396/502

(Continued)

FOREIGN PATENT DOCUMENTS

CN 115390213 A 11/2022

OTHER PUBLICATIONS

Chinese Office Action dated Jul. 3, 2024 in Application No. 202323248282.0, 1 page.

*Primary Examiner* — Cara E Rakowski
(74) *Attorney, Agent, or Firm* — MUNCY, GEISSLER, OLDS & LOWE, P.C.

(57) ABSTRACT

An optical system is provided, including a first module configured to hold a first optical member. The first module includes a first movable portion, a first fixed portion, and a first driving assembly. The first movable portion is configured to connect the first optical member, and is movable relative to the fixed portion. The first driving assembly is configured to drive the first movable portion to move relative to the fixed portion.

16 Claims, 5 Drawing Sheets

(51) Int. Cl.
*G03B 13/34* (2021.01)
*G03B 13/36* (2021.01)
*G03B 30/00* (2021.01)
*H02K 33/00* (2006.01)
*H02K 33/18* (2006.01)

(52) U.S. Cl.
CPC ............ *G03B 30/00* (2021.01); *H02K 33/00* (2013.01); *H02K 33/18* (2013.01)

(58) Field of Classification Search
CPC ........ H02K 33/18; H04N 23/50; H04N 23/67; H04N 23/68
See application file for complete search history.

(56) References Cited

U.S. PATENT DOCUMENTS 9,772,506 B2 * 9/2017 Hu ........ G02B 27/646
9,904,070 B2 * 2/2018 Hu ........ G02B 7/023
9,904,072 B2 * 2/2018 Fan ........ H02K 41/0356
9,989,726 B2 * 6/2018 Huang ........ H01F 7/064
10,261,284 B2 * 4/2019 Huang ........ H01F 7/08
10,338,403 B2 * 7/2019 Hu ........ G02B 27/646
10,359,599 B2 * 7/2019 Hsu ........ G02B 7/08
10,394,045 B2 * 8/2019 Hu ........ H02K 41/0356
10,416,533 B2 * 9/2019 Hsu ........ G03B 7/10
10,423,005 B2 * 9/2019 Hu ........ G02B 27/646
10,495,897 B2 * 12/2019 Kuo ........ G02B 27/646
10,541,592 B2 * 1/2020 Moto ........ H02K 33/02
10,564,384 B2 * 2/2020 Huang ........ G03B 5/00
10,571,650 B2 * 2/2020 Yu ........ G02B 7/10
10,585,261 B2 * 3/2020 Moto ........ G02B 7/021
10,606,022 B2 * 3/2020 Hsu ........ G02B 7/026
10,649,172 B2 * 5/2020 Liu ........ H02K 41/0354
10,739,549 B2 * 8/2020 Liu ........ G02B 7/08
10,750,065 B2 * 8/2020 Wu ........ H04N 23/54
10,764,475 B2 * 9/2020 Hu ........ H04N 23/55
10,809,487 B2 * 10/2020 Chen ........ G02B 7/102
10,816,874 B2 * 10/2020 Hsu ........ G03B 17/12
10,852,458 B2 * 12/2020 Hu ........ H04N 23/55
10,877,290 B2 * 12/2020 Chen ........ G02B 27/646
10,887,498 B2 * 1/2021 Hu ........ G02B 13/0065
10,935,701 B2 * 3/2021 Kao ........ G02B 13/0065
10,935,809 B2 * 3/2021 Hu ........ G02B 7/09
10,962,735 B2 * 3/2021 Wang ........ H02K 41/0356
10,969,561 B2 * 4/2021 Hu ........ G03B 3/02
10,983,302 B2 * 4/2021 Hu ........ G02B 7/09
10,996,484 B2 * 5/2021 Hu ........ G03B 5/00
11,002,941 B2 * 5/2021 Cheng ........ H04N 23/54
11,022,726 B2 * 6/2021 Kuo ........ F03G 7/06143
11,029,453 B2 * 6/2021 Hu ........ G02B 13/0075
11,032,472 B2 * 6/2021 Hu ........ G02B 26/101
11,067,822 B2 * 7/2021 Hu ........ G02B 27/646
11,070,152 B2 * 7/2021 Chan ........ G02B 7/09
11,076,029 B2 * 7/2021 Hu ........ H04N 23/57
11,099,349 B2 * 8/2021 Moto ........ G02B 7/08
11,119,294 B2 * 9/2021 Weng ........ G02B 13/0015
11,125,920 B2 * 9/2021 Fan ........ G03B 30/00
11,126,068 B2 * 9/2021 Hu ........ G03B 3/10
11,131,825 B2 * 9/2021 Shen ........ H02K 11/21
11,175,475 B2 * 11/2021 Hu ........ G02B 7/023
11,181,669 B2 * 11/2021 Hu ........ G02B 7/08
11,187,965 B2 * 11/2021 Hu ........ H04N 23/54
11,190,085 B2 * 11/2021 Kuo ........ G02B 27/646
11,204,480 B2 * 12/2021 Hu ........ H02K 5/24
11,226,466 B2 * 1/2022 Wang ........ G02B 7/023
11,226,469 B2 * 1/2022 Fan ........ G02B 27/646
11,256,058 B2 * 2/2022 Hsu ........ G02B 7/08
11,256,065 B2 * 2/2022 Chen ........ G02B 13/001
11,256,066 B2 * 2/2022 Hu ........ G02B 13/0065
11,256,107 B2 * 2/2022 Hu ........ G03B 3/10
11,262,528 B2 * 3/2022 Lin ........ H02K 5/24
11,287,605 B2 * 3/2022 Huang ........ G03B 17/02
11,287,725 B2 * 3/2022 Weng ........ H02K 33/18
11,294,140 B2 * 4/2022 Wu ........ G02B 7/09
11,294,141 B2 * 4/2022 Kao ........ G02B 7/09
11,294,172 B2 * 4/2022 Hu ........ G02B 27/646
11,300,757 B2 * 4/2022 Lin ........ G02B 7/08
11,300,759 B2 * 4/2022 Yu ........ G02B 7/08
11,300,804 B2 * 4/2022 Chan ........ H02K 41/0354
11,314,033 B2 * 4/2022 Hu ........ G02B 7/02
11,314,037 B2 * 4/2022 Ho ........ G03B 17/02
11,314,038 B2 * 4/2022 Wu ........ H04N 23/57
11,314,101 B2 * 4/2022 Chan ........ G02B 7/02
11,320,629 B2 * 5/2022 Ho ........ G02B 27/646
11,322,628 B2 * 5/2022 Wu ........ H10F 39/804
11,333,847 B2 * 5/2022 Hu ........ G03B 3/10
11,340,418 B2 * 5/2022 Wu ........ H04N 23/687
11,360,284 B2 * 6/2022 Hu ........ G02B 26/02
11,366,278 B2 * 6/2022 Hu ........ G02B 7/09
11,372,192 B2 * 6/2022 Liu ........ G02B 7/04
11,397,303 B2 * 7/2022 Hsiao ........ G02B 27/64
11,397,369 B2 * 7/2022 Wu ........ G02B 27/0068
11,397,370 B2 * 7/2022 Yu ........ G02B 7/04
11,422,330 B2 * 8/2022 Hu ........ H02K 41/0356
11,422,332 B2 * 8/2022 Ho ........ H02K 41/0354
11,422,333 B2 * 8/2022 Chen ........ G02B 13/001
11,422,334 B2 * 8/2022 Fu ........ G02B 26/085
11,422,357 B2 * 8/2022 Hu ........ G02B 3/12
11,428,949 B2 * 8/2022 Hu ........ G02B 7/08
11,448,850 B2 * 9/2022 Tsai ........ G02B 7/08
11,448,852 B2 * 9/2022 Hu ........ G02B 7/04
11,448,895 B2 * 9/2022 Hsu ........ G01S 7/4816
11,467,364 B2 * 10/2022 Wang ........ G02B 7/08
11,474,321 B2 * 10/2022 Hu ........ G02B 7/02
11,480,849 B2 * 10/2022 Wu ........ G02B 9/62
11,493,727 B2 * 11/2022 Cheng ........ G02B 7/102
11,493,728 B2 * 11/2022 Hu ........ G03B 3/10
11,520,160 B2 * 12/2022 Hu ........ G02B 26/0816
11,528,394 B2 * 12/2022 Liu ........ G03B 5/00
11,536,923 B2 * 12/2022 Wang ........ G02B 7/005
11,555,976 B2 * 1/2023 Wu ........ G02B 7/08
11,555,981 B2 * 1/2023 Hu ........ H04N 23/57
11,561,360 B2 * 1/2023 Ryoo ........ H02N 2/142
11,567,290 B2 * 1/2023 Wu ........ G03B 3/10
11,567,291 B2 * 1/2023 Hu ........ H04N 23/687
11,573,480 B2 * 2/2023 Ichihashi ........ G03B 5/02
11,579,398 B2 * 2/2023 Kao ........ G02B 27/646
11,586,002 B2 * 2/2023 Weng ........ G02B 27/0018
11,614,596 B2 * 3/2023 Hu ........ G03B 9/06
359/557
11,619,799 B2 * 4/2023 Lin ........ G01L 1/16
348/373
11,619,800 B2 * 4/2023 Lin ........ G02B 7/09
359/823
11,624,936 B2 * 4/2023 Wu ........ H02K 41/0356
359/823
11,627,241 B2 * 4/2023 Hu ........ H04N 23/54
348/360
11,630,282 B2 * 4/2023 Chen ........ G02B 7/08
359/823
11,641,515 B2 * 5/2023 Hsu ........ H02K 41/0356
348/373
11,650,480 B2 * 5/2023 Weng ........ H02K 41/0356
359/756
11,650,481 B2 * 5/2023 Wu ........ G03B 3/02
359/811
11,665,411 B2 * 5/2023 Hu ........ G03B 3/10
348/374
11,675,156 B2 * 6/2023 Song ........ H04N 23/54
359/824
11,677,304 B2 * 6/2023 Chen ........ G02B 27/646
359/833
11,678,036 B2 * 6/2023 Hu ........ G02B 7/005
359/823
11,681,114 B2 * 6/2023 Tang ........ G02B 7/028
359/823
11,681,156 B2 * 6/2023 Hu ........ G02B 13/0065
359/554
11,681,203 B2 * 6/2023 Wang ........ H02K 41/0356
396/510
11,689,788 B2 * 6/2023 Hu ........ G02B 7/026
359/822

(56) References Cited

U.S. PATENT DOCUMENTS

| | | | | |
|---|---|---|---|---|
| 11,693,213 | B2 * | 7/2023 | Weng | G02B 9/04 359/793 |
| 11,698,525 | B2 * | 7/2023 | Tsai | G02B 13/0015 359/223.1 |
| 11,711,597 | B2 * | 7/2023 | Huang | G02B 27/646 |
| 11,714,332 | B2 * | 8/2023 | Wang | G02B 27/0006 359/813 |
| 11,719,905 | B2 * | 8/2023 | Fan | G02B 7/1828 359/819 |
| 11,719,996 | B2 * | 8/2023 | Hu | G02B 7/285 359/696 |
| 11,740,538 | B2 * | 8/2023 | Yu | G02B 7/04 359/726 |
| 11,782,324 | B2 * | 10/2023 | Wu | H02K 41/0356 348/208.99 |
| 11,796,894 | B2 * | 10/2023 | Yu | G02B 7/08 |
| 11,808,948 | B2 * | 11/2023 | Chen | G03B 5/04 |
| 11,809,013 | B2 * | 11/2023 | Ryoo | G03B 13/36 |
| 11,815,736 | B2 * | 11/2023 | Hu | G03B 30/00 |
| 11,852,888 | B2 * | 12/2023 | Wu | G02B 7/09 |
| 11,860,443 | B2 * | 1/2024 | Hu | G02B 7/08 |
| 11,860,513 | B2 * | 1/2024 | Ichihashi | G03B 5/00 |
| 11,863,849 | B2 * | 1/2024 | Hu | H04N 23/51 |
| 11,867,925 | B2 * | 1/2024 | Wu | G02B 26/0816 |
| 11,867,970 | B2 * | 1/2024 | Lin | H02K 37/04 |
| 11,880,087 | B2 * | 1/2024 | Shen | G02B 7/09 |
| 11,885,976 | B2 * | 1/2024 | Wu | H04N 23/687 |
| 11,886,035 | B2 * | 1/2024 | Lin | G02B 7/04 |
| 11,888,374 | B2 * | 1/2024 | Hu | H02N 2/062 |
| 11,894,728 | B2 * | 2/2024 | Kuo | G02B 7/08 |
| 11,899,274 | B2 * | 2/2024 | Hu | H04N 23/54 |
| 11,906,810 | B2 * | 2/2024 | Wang | G01B 7/003 |
| 11,914,116 | B2 * | 2/2024 | Weng | G02B 7/1805 |
| 11,914,169 | B2 * | 2/2024 | Fan | G01S 17/42 |
| 11,934,034 | B2 * | 3/2024 | Fan | G03B 3/00 |
| 11,982,866 | B2 * | 5/2024 | Hu | H04N 23/55 |
| 11,988,847 | B2 * | 5/2024 | Wang | H02K 11/215 |
| 11,991,435 | B2 * | 5/2024 | Lo | H04N 23/55 |
| 11,991,436 | B2 * | 5/2024 | Wang | H02K 41/0354 |
| 12,032,224 | B2 * | 7/2024 | Lin | G02B 7/09 |
| 12,038,682 | B2 * | 7/2024 | Hu | H04N 23/6812 |
| 12,061,372 | B2 * | 8/2024 | Liu | G02B 7/08 |
| 12,066,745 | B2 * | 8/2024 | Yu | G02B 7/08 |
| 12,078,863 | B2 * | 9/2024 | Kao | G02B 26/0816 |
| 12,105,408 | B2 * | 10/2024 | Chen | G03B 3/10 |
| 12,112,617 | B2 * | 10/2024 | Wang | G02B 27/646 |
| 12,140,816 | B2 * | 11/2024 | Lin | G02B 7/08 |
| 12,153,280 | B2 * | 11/2024 | Chen | H02K 41/0356 |
| 12,153,330 | B2 * | 11/2024 | Wu | G02B 7/04 |
| 12,153,336 | B2 * | 11/2024 | Wang | G03B 5/00 |
| 12,159,752 | B2 * | 12/2024 | Hu | G03B 9/14 |
| 12,174,444 | B2 * | 12/2024 | Wang | G03B 5/00 |
| 12,174,449 | B2 * | 12/2024 | Weng | G02B 7/1805 |
| 12,181,631 | B2 * | 12/2024 | Hu | H04N 23/57 |
| 12,181,658 | B2 * | 12/2024 | Tsai | G02B 13/0015 |
| 12,204,170 | B2 * | 1/2025 | Liu | G03B 5/02 |
| 12,210,208 | B2 * | 1/2025 | Chang | G02B 7/08 |
| 12,216,326 | B2 * | 2/2025 | Lin | G02B 7/09 |
| 12,222,579 | B2 * | 2/2025 | Wu | G02B 7/20 |
| 12,225,276 | B2 * | 2/2025 | Hu | H10N 30/202 |
| 12,235,478 | B2 * | 2/2025 | Weng | G03B 5/00 |
| 12,235,510 | B2 * | 2/2025 | Lin | G02B 7/023 |
| 12,235,512 | B2 * | 2/2025 | Weng | G02B 7/028 |
| 12,235,513 | B2 * | 2/2025 | Tang | G02B 7/08 |
| 12,235,515 | B2 * | 2/2025 | Liu | H04N 23/54 |
| 12,287,526 | B2 * | 4/2025 | Hu | H04N 23/54 |
| 12,287,531 | B2 * | 4/2025 | Chen | G02B 26/101 |
| 12,287,565 | B2 * | 4/2025 | Su | G02B 7/09 |
| 12,289,525 | B2 * | 4/2025 | Hu | H04N 23/55 |
| 12,332,546 | B2 * | 6/2025 | Yu | G02B 7/08 |
| 12,339,576 | B2 * | 6/2025 | Chen | G02B 27/0172 |
| 12,353,047 | B2 * | 7/2025 | Cheng | G03B 5/00 |
| 12,360,329 | B2 * | 7/2025 | Hu | G02B 3/14 |
| 12,375,787 | B2 * | 7/2025 | Wang | H01F 7/081 |
| 12,375,809 | B2 * | 7/2025 | Wu | G02B 7/09 |
| 12,379,570 | B2 * | 8/2025 | Yu | G02B 27/646 |
| 12,386,141 | B2 * | 8/2025 | Yu | G02B 7/08 |
| 12,386,145 | B2 * | 8/2025 | Hsu | G02B 7/08 |
| 12,405,407 | B2 * | 9/2025 | Wang | G02B 5/005 |
| 12,416,777 | B2 * | 9/2025 | Hsiao | G03B 5/02 |
| 12,416,779 | B2 * | 9/2025 | Hsu | G02B 27/646 |
| 12,422,644 | B2 * | 9/2025 | Hsiao | G02B 15/142 |
| 12,436,359 | B2 * | 10/2025 | Huang | G03B 5/00 |
| 12,449,630 | B2 * | 10/2025 | Hsiao | G02B 7/005 |
| 12,449,631 | B2 * | 10/2025 | Chen | H10N 30/802 |
| 12,449,667 | B2 * | 10/2025 | Wu | H04N 23/00 |
| 12,449,716 | B2 * | 10/2025 | Wu | G02B 5/005 |
| 2014/0086568 | A1 * | 3/2014 | Nomura | G02B 27/646 396/55 |
| 2015/0160438 | A1 * | 6/2015 | Okuda | G02B 13/0065 359/557 |
| 2015/0215542 | A1 * | 7/2015 | Nomura | H04N 23/55 348/208.11 |
| 2016/0377881 | A1 * | 12/2016 | Jung | G02B 7/08 359/824 |
| 2017/0094187 | A1 * | 3/2017 | Sharma | G02B 7/09 |
| 2018/0074415 | A1 * | 3/2018 | Wu | H04N 23/55 |
| 2020/0036301 | A1 * | 1/2020 | Wu | H02K 41/0356 |
| 2021/0278627 | A1 * | 9/2021 | Chen | G02B 26/085 |
| 2022/0091482 | A1 * | 3/2022 | Mireault | G02B 7/08 |
| 2022/0357588 | A1 * | 11/2022 | Fan | G02B 7/023 |
| 2022/0397741 | A1 * | 12/2022 | Fan | H02K 41/02 |
| 2023/0127990 | A1 * | 4/2023 | Chen | G02B 7/08 359/819 |
| 2023/0132120 | A1 * | 4/2023 | Chen | G02B 7/04 335/220 |
| 2023/0204899 | A1 * | 6/2023 | Wu | G02B 7/08 |
| 2023/0204972 | A1 * | 6/2023 | Wu | G02B 7/08 |
| 2023/0204973 | A1 * | 6/2023 | Wu | H04N 23/54 |
| 2023/0205048 | A1 * | 6/2023 | Wu | G02B 27/646 |
| 2023/0205049 | A1 * | 6/2023 | Wu | G03B 30/00 |
| 2023/0209201 | A1 * | 6/2023 | Wu | G02B 26/08 |
| 2023/0225211 | A1 * | 7/2023 | Chen | H10N 30/85 310/311 |
| 2023/0229014 | A1 * | 7/2023 | Weng | H04N 23/687 359/557 |
| 2023/0236386 | A1 * | 7/2023 | Cheng | G02B 7/09 359/824 |
| 2023/0266561 | A1 * | 8/2023 | Hsu | G02B 27/646 359/823 |
| 2023/0266579 | A1 * | 8/2023 | Chen | G02B 26/02 359/601 |
| 2023/0269451 | A1 * | 8/2023 | Hsu | G02B 7/021 348/374 |
| 2023/0288658 | A1 * | 9/2023 | Su | G01B 7/003 |
| 2024/0012234 | A1 * | 1/2024 | Wang | G03B 9/40 |
| 2024/0012311 | A1 * | 1/2024 | Fan | G03B 5/04 |
| 2024/0027727 | A1 * | 1/2024 | Hu | G02B 7/102 |
| 2024/0077697 | A1 * | 3/2024 | Zhuang | G02B 13/001 |
| 2024/0077744 | A1 * | 3/2024 | Zhuang | G02B 7/09 |
| 2024/0077745 | A1 * | 3/2024 | Zhuang | G02B 5/005 |
| 2024/0085718 | A1 * | 3/2024 | Zhuang | G02B 27/646 |
| 2024/0094498 | A1 * | 3/2024 | Zhuang | G02B 27/646 |
| 2024/0134147 | A1 * | 4/2024 | Zhuang | G02B 7/08 |
| 2024/0142746 | A1 * | 5/2024 | Wu | G02B 7/08 |
| 2024/0142747 | A1 * | 5/2024 | Wu | G03B 30/00 |
| 2024/0142749 | A1 * | 5/2024 | Hu | G02B 27/646 |
| 2024/0142854 | A1 * | 5/2024 | Wu | G02B 7/04 |
| 2024/0142855 | A1 * | 5/2024 | Wu | G03B 30/00 |
| 2024/0142858 | A1 * | 5/2024 | Wu | G02B 13/0065 |
| 2024/0151932 | A1 * | 5/2024 | Hu | H02K 41/0354 |
| 2024/0151935 | A1 * | 5/2024 | Hu | G02B 7/08 |
| 2024/0151936 | A1 * | 5/2024 | Hu | G02B 7/08 |
| 2024/0152029 | A1 * | 5/2024 | Hu | G03B 3/10 |
| 2024/0152034 | A1 * | 5/2024 | Chao | G03B 3/10 |
| 2024/0176094 | A1 * | 5/2024 | Wu | G02B 7/02 |
| 2024/0176099 | A1 * | 5/2024 | Zhuang | G03B 3/10 |
| 2024/0176158 | A1 * | 5/2024 | Zhuang | G02B 7/08 |
| 2024/0176159 | A1 * | 5/2024 | Wu | G03B 13/36 |
| 2024/0219674 | A1 * | 7/2024 | Zhuang | G02B 7/04 |
| 2024/0219676 | A1 * | 7/2024 | Fan | G02B 7/023 |
| 2024/0219677 | A1 * | 7/2024 | Fan | G02B 7/04 |

(56) References Cited

U.S. PATENT DOCUMENTS

2024/0241337 A1* 7/2024 Chen ........................ G03B 3/10
2024/0241426 A1* 7/2024 Chen ........................ G02B 7/08
2024/0248280 A1* 7/2024 Zhuang .................... G02B 7/08
2024/0264405 A1* 8/2024 Hu ........................... G02B 7/08
2024/0272400 A1* 8/2024 Wu ...................... G02B 27/646
2024/0295744 A1* 9/2024 Wu ........................ G03B 13/36
2024/0297560 A1* 9/2024 Peng ...................... H02K 41/03
2024/0302672 A1* 9/2024 Peng .................... G02B 27/646
2024/0329361 A1* 10/2024 Lin .......................... G02B 7/09
2024/0337860 A1* 10/2024 Wang ..................... G03B 17/12
2024/0337907 A1* 10/2024 Wang ....................... G03B 7/26
2024/0337909 A1* 10/2024 Peng ........................ G03B 7/26
2024/0369909 A1* 11/2024 Hsieh ....................... G03B 9/06
2024/0402457 A1* 12/2024 Chao ........................ G02B 7/08
2024/0427218 A1* 12/2024 Chen ........................ G03B 3/10
2025/0020889 A1* 1/2025 Chien ...................... G02B 7/08
2025/0020972 A1* 1/2025 Chien ...................... G03B 3/10
2025/0020975 A1* 1/2025 Lee .......................... G03B 5/00
2025/0028143 A1* 1/2025 Zhuang .................... G03B 5/00
2025/0028144 A1* 1/2025 Wang ....................... G03B 5/00
2025/0028145 A1* 1/2025 Wang ....................... G02B 7/09
2025/0028146 A1* 1/2025 Wang ..................... G03B 13/36
2025/0028148 A1* 1/2025 Wu ...................... H04N 23/685
2025/0028149 A1* 1/2025 Shen .................... G02B 27/646
2025/0028185 A1* 1/2025 Shen .................... G02B 27/646
2025/0044545 A1* 2/2025 Hu ........................... G02B 7/09
2025/0044546 A1* 2/2025 Hu ........................... G02B 7/08
2025/0053069 A1* 2/2025 Wu .......................... G02B 7/04
2025/0067954 A1* 2/2025 Weng ..................... G02B 5/005
2025/0102709 A1* 3/2025 Meng ....................... G03B 3/10
2025/0102758 A1* 3/2025 Wang ................... G02B 27/646
2025/0102759 A1* 3/2025 Wang ....................... G03B 9/42
2025/0102880 A1* 3/2025 Wang ....................... G03B 9/42
2025/0102884 A1* 3/2025 Meng ....................... G02B 7/09
2025/0110307 A1* 4/2025 Hu ....................... G02B 27/646
2025/0116799 A1* 4/2025 Chao ...................... G02B 5/005
2025/0116842 A1* 4/2025 Shen ........................ G02B 7/08
2025/0116844 A1* 4/2025 Shen .................... G02B 7/1805
2025/0138390 A1* 5/2025 Lin .......................... G03B 5/00
2025/0147265 A1* 5/2025 Chao ........................ G02B 7/04
2025/0147267 A1* 5/2025 Fan .......................... G02B 7/08
2025/0147268 A1* 5/2025 Chen ........................ G02B 7/09
2025/0147269 A1* 5/2025 Shen ........................ G02B 7/09
2025/0155668 A1* 5/2025 Fan ........................ H04N 23/51
2025/0155669 A1* 5/2025 Fan ...................... G02B 7/1805
2025/0155725 A1* 5/2025 Zhuang .................... G02B 7/08
2025/0155781 A1* 5/2025 Fan .......................... G03B 5/00
2025/0155782 A1* 5/2025 Fan ...................... G02B 13/001
2025/0180857 A1* 6/2025 Zhuang .................... G02B 7/08
2025/0180858 A1* 6/2025 Zhuang .................... G02B 7/09
2025/0199265 A1* 6/2025 Wang ....................... G03B 5/04
2025/0199266 A1* 6/2025 Wang ....................... G03B 5/02
2025/0199381 A1* 6/2025 Wang ....................... G03B 5/04
2025/0208372 A1* 6/2025 Lo .......................... G02B 7/102
2025/0208374 A1* 6/2025 Lo .......................... G03B 30/00
2025/0208375 A1* 6/2025 Meng ....................... G02B 7/08
2025/0208431 A1* 6/2025 Lo ........................ G02B 27/646
2025/0231371 A1* 7/2025 Chang .................. G02B 27/646
2025/0237845 A1* 7/2025 Chang ...................... G02B 7/08
2025/0278012 A1* 9/2025 Yu ........................... G03B 5/02
2025/0284088 A1* 9/2025 Chen ........................ G02B 7/08
2025/0291151 A1* 9/2025 Wu .......................... G03B 5/00
2025/0334855 A1* 10/2025 Cheng ...................... G03B 9/06

* cited by examiner

FIG. 4

OPTICAL SYSTEM

CROSS REFERENCE TO RELATED APPLICATIONS

This application claims the benefit of U.S. Provisional Application No. 63/428,238, filed Nov. 28, 2022, the entirety of which is incorporated by reference herein.

BACKGROUND OF THE INVENTION

Field of the Invention

The application relates in general to an optical system, and in particular, to an optical system configured to take photographs.

Description of the Related Art

As technology has advanced, a lot of electronic devices (for example, tablet computers and smartphones) have been given the functionality of taking photographs and recording video. These electronic devices have become more commonplace, and have been developed to be more convenient and thin. More and more options are provided for users to choose from.

BRIEF SUMMARY OF INVENTION

An embodiment of the invention provides an optical system, including a first module configured to hold a first optical member. The first module includes a first movable portion, a first fixed portion, and a first driving assembly. The first movable portion is configured to connect the first optical member, and is movable relative to the fixed portion. The first driving assembly is configured to drive the first movable portion to move relative to the fixed portion.

In some embodiments, the first fixed portion includes a case and a base. The case has a first opening, and the first opening corresponds to a light. The base has a second opening, and the second opening corresponds to the light In some embodiments, the optical system further includes a second module configured to receive the light leaving the first module, and the base has a C-shaped structure, and a receiving portion configured to receive at least a portion of the second module is formed at a notch of the C-shaped structure.

In some embodiments, the second module includes a second optical member, and the receiving portion is configured to receive at least a portion of the second optical member In some embodiments, as viewed along the first direction, at least a portion of the base overlaps the second optical member, at least a portion of the first driving assembly overlaps the second optical member, and the first direction is not parallel to the incident direction of the light.

In some embodiments, the first movable portion is movably connected to the base via at least one supporting member. As viewed from a second direction that is perpendicular to the incident direction and the first direction, at least a portion of the first driving assembly overlaps the second optical member, and at least a portion of the supporting member overlaps the second optical member.

In some embodiments, as viewed along the incident direction of the light, the first optical member and the second optical member overlap.

In some embodiments, as viewed along the incident direction of the light, the first module includes a polygonal structure, and the polygonal structure has a first side and a second side, which are opposite each other. The receiving portion is situated at the first side, and the receiving portion communicates with the second opening.

In some embodiments, the optical system further includes an image sensor configured to receive the light leaving the second module, and the distance between the first side and the image sensor is less than the distance between the second side and the image sensor.

In some embodiments, the second module has an outer surface and a protruding portion, the outer surface is adjacent to the second side, and the protruding portion protrudes from the outer surface, wherein the base is in contact with the top surface of the protruding portion.

In some embodiments, the first driving assembly includes an electromagnetic driving member, the first module further includes a counterweight member, and the electromagnetic driving member and the counterweight member are disposed on the first movable portion, wherein the counterweight member is situated at the first side, the electromagnetic driving member is situated at the second side, and the counterweight member weighs substantially the same as the electromagnetic driving member.

In some embodiments, the optical system further includes a second module, and the second module includes a second fixed portion and a second circuit assembly. The second fixed portion is fixedly connected to the base. The second circuit assembly is configured to electrically connect an external circuit, wherein the second circuit assembly is electrically connected to the first circuit assembly of the first module.

In some embodiments, the second fixed portion includes a first docking portion, and the first docking portion has a depression structure, wherein the access line of the second circuit assembly is disposed in the first docking portion.

In some embodiments, the second fixed portion further includes a second docking portion, the second docking portion has a depression structure, and the first docking portion and the second docking portion are formed on opposite sides of the second fixed portion, wherein the optical system further includes a third module disposed in the second docking portion.

In some embodiments, the first movable portion includes a holder, a frame, an elastic member, and a plurality of supporting members. The holder is configured to connect the first optical member. The frame surrounds the holder. The elastic member is connected to the holder and the frame. The supporting members are connected to the elastic member and the base. The elastic member has a plurality of sections that are separate from each other, and the sections are one-on-one connected to the supporting members.

In some embodiments, the first driving assembly includes a sensing member disposed on the holder, and the sensing member is electrically connected to the sections via different circuits on the holder.

In some embodiments, the first driving assembly further includes a sensing object disposed on the frame and corresponding to the sensing member, and the optical system further includes a second driving assembly disposed on the holder, wherein the second driving assembly is not disposed between the sensing member and the sensing object.

In some embodiments, the optical system further includes an image sensor configured to receive the light leaving the second module, wherein as viewed along the incident direction of the light, the first optical member is separate from the image sensor.

BRIEF DESCRIPTION OF DRAWINGS

The invention can be more fully understood by reading the subsequent detailed description and examples with references made to the accompanying drawings, wherein:

FIG. 4 is an exploded-view diagram of the first module in the optical component according to an embodiment of the invention.

DETAILED DESCRIPTION OF INVENTION

The making and using of the embodiments of the optical system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
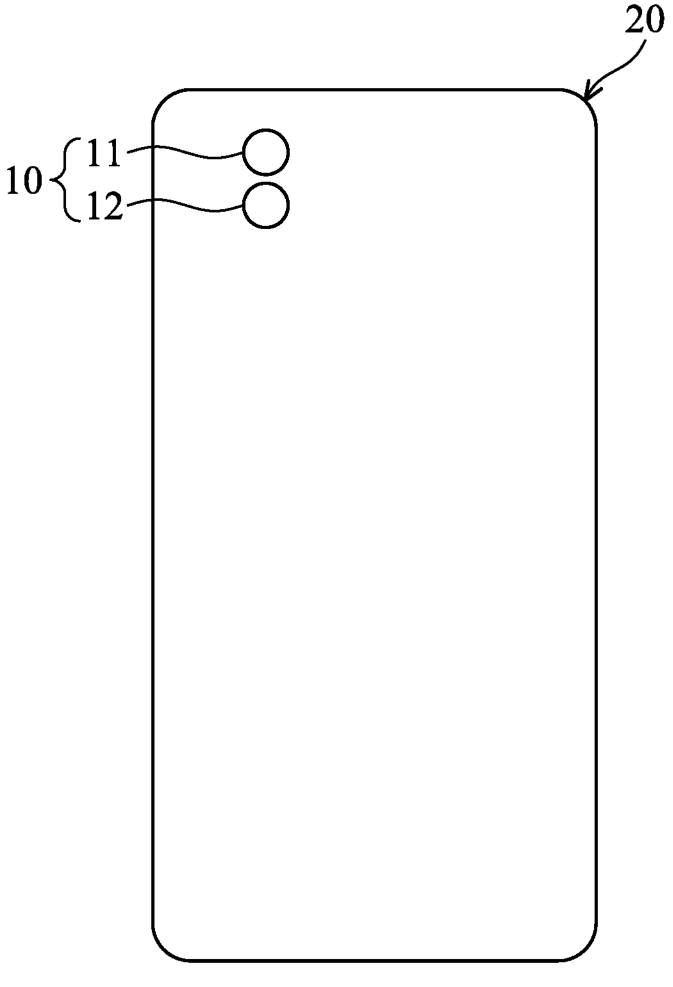
FIG. 1 is a schematic diagram of an electronic device with an optical system according to an embodiment of the invention.
Figure 1:
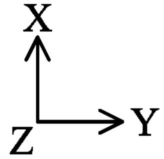

Referring to FIG. 1, the optical system 10 according to an embodiment of the invention can be disposed in an electronic device 20 and used to take photos or record videos. The electronic device 20 can be a smartphone, a tablet computer, or a digital camera, for example, but it is not limited thereto. When taking photos or recording videos, the optical system 10 can receive the light and form an image, wherein the image can be transmitted to a processor (not shown) in the electronic device 20, where post-processing of the image can be performed.

For example, the optical system 10 can include a plurality of optical components 11 and 12 having different focal lengths, and each of the optical components 11 and 12 can form the image independently. Therefore, one of the optical components 11 and 12 can photograph the wide range, and the other one of the optical components 11 and 12 can photograph the far distance. In some embodiments, the optical components 11 and 12 can have same focal length.

Figure 2:
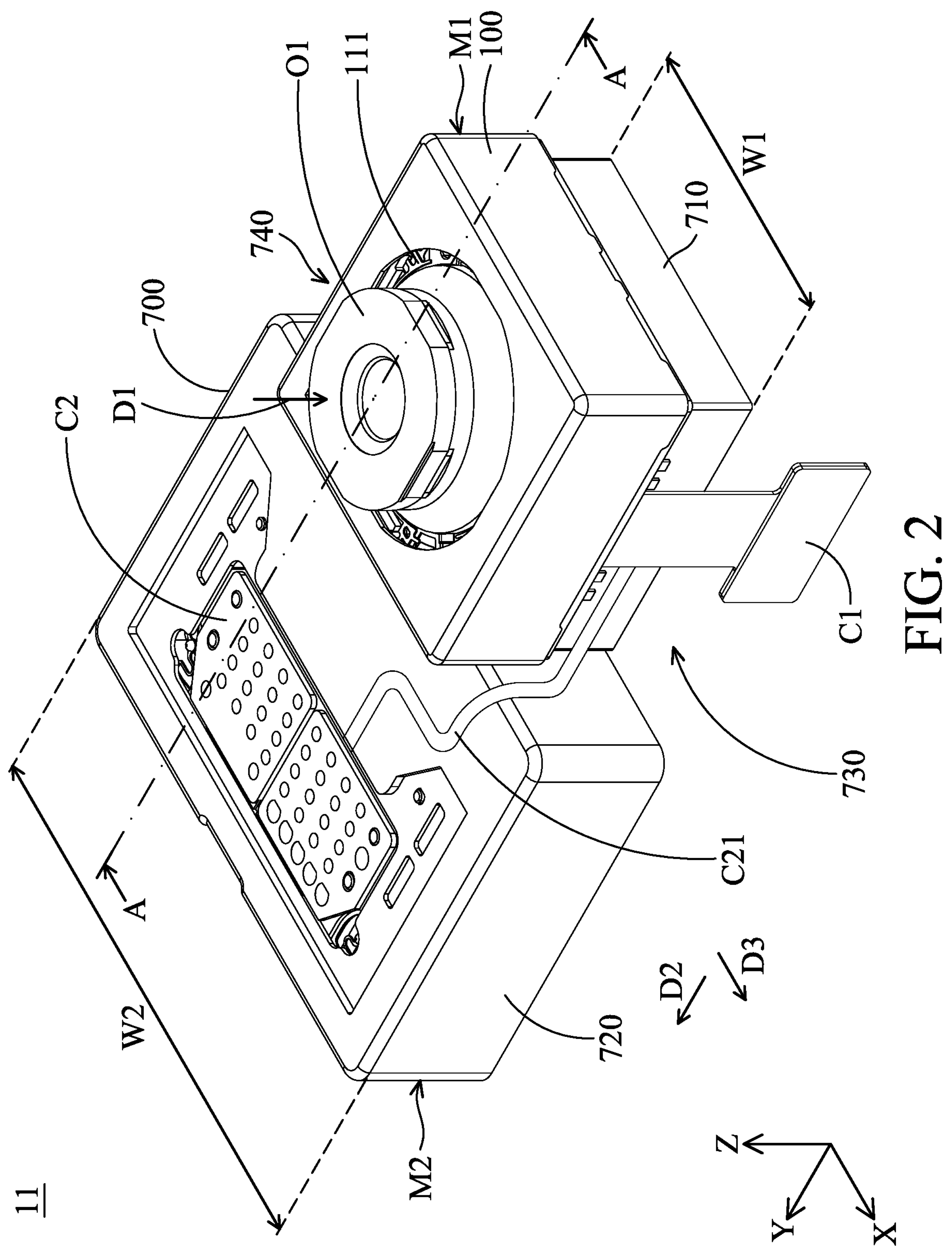
FIG. 2 is a schematic diagram of the optical component in the optical system according to an embodiment of the invention.
Figure 3:
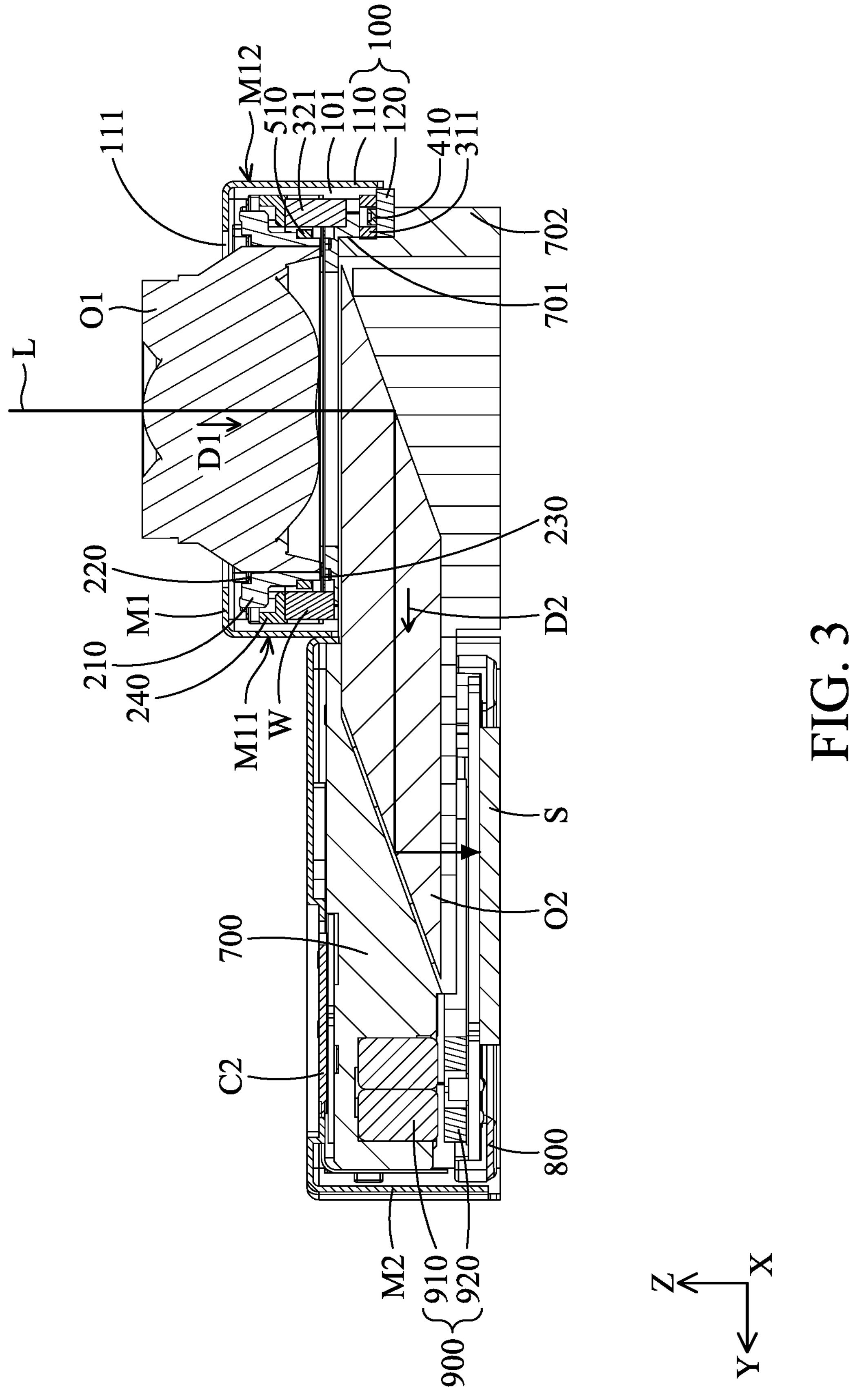
FIG. 3 is a cross-sectional view taken along the line A-A in FIG. 2.

FIG. 2 is a schematic diagram of the optical component 11, and FIG. 3 is a cross-sectional view taken along the line A-A in FIG. 2. As shown in FIG. 2 and FIG. 3, the optical component 11 of the optical system 10 includes a first module M1, a second module M2, and an image sensor S. The external light L can pass through the first module M1 and the second module M2 in sequence, and then reach the image sensor S. More in detail, the light L can pass through a first optical member O1 in the first module M1 along the incident direction D1. When the light L leaves the first module M1 and enters the second module M2, a second optical member O2 in the second module M2 can adjust the moving direction of the light L (for example, the moving direction of the light L can be adjusted from the incident direction D1 to the first direction D2). After that, the light L can leave the second module M2 and reach the image sensor S. Therefore, as viewed along the incident direction D1 and/or as viewed along the first direction D2, the first module M1 and the image sensor S are separate from each other.

Figure 4:
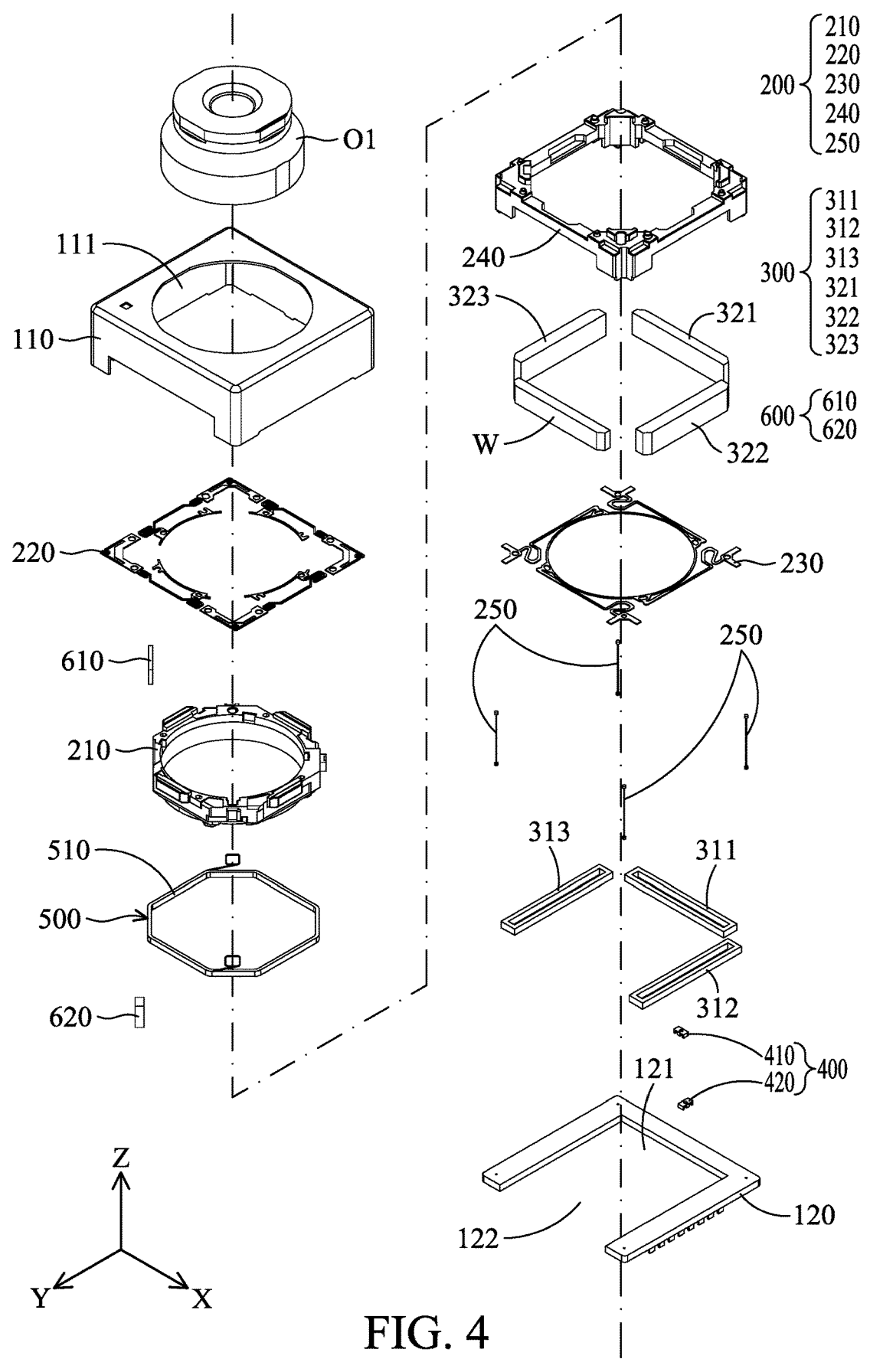

FIG. 4 is an exploded-view diagram of the first module M1 in the optical component 11. As shown in FIG. 2 to FIG. 4, the first module M1 primarily includes a first fixed portion 100, a first movable portion 200, a first driving assembly 300, a first sensing assembly 400, a second driving assembly 500, a second sensing assembly 600, and the first optical member O1. The structures and the arrangements of the aforementioned members are discussed below.

The first fixed portion 100 includes a case 110 and a base 120. The case 110 and the base 120 can engaged with each other to form an accommodating space 101, and the first movable portion 200, the first driving assembly 300, the first sensing assembly 400, the second driving assembly 500, and the second sensing assembly 600 can be accommodated in the accommodating space 101. The case 110 includes a first opening 111 corresponding to the light L, and the base 120 includes a second opening 121 corresponding to the light L. In other words, when the light L passes through the first module M1, it can pass through the first opening 111 and the second opening 121 in sequence. In this embodiment, when the optical system 10 is assembled, the first optical member O1 can pass through the first opening 111 and protrude from the upper surface of the case 110, but it is not limited thereto.

The base 120 has a C-shaped structure, and a receiving portion 122 can be formed at the notch of the C-shaped structure. The receiving portion 122 communicates with the second opening 121. As viewed along the incident direction D1, the first module M1 has a polygonal structure (such as a rectangular structure) which includes a first side M11 and a second side M12, which are opposite each other. The distance between the first side M11 and the image sensor S is less than the distance between the second side M12 and the image sensor S, and the receiving portion 122 is formed at the first side M11. The second optical member O2 in the second module M2 can pass through the receiving portion 122 and enter the second opening 121. Therefore, when the optical component 11 of the optical system 10 is assembled, at least a portion of the second optical member O2 is received in the receiving portion 122 and the second opening 121. The thickness of the optical component 11 in the Z-axis can be reduced, and the miniaturization of the optical system 10 is facilitated.

The first movable portion 200 includes a holder 210, an elastic member 220, an elastic member 230, a frame 240, and a plurality of supporting members 250. The holder 210 is configured to hold the first optical member O1. For example, the first optical member O1 can be a camera lens with a plurality of lenses, but it is not limited thereto.

The holder 210 is surrounded by the frame 240, and is connected to the frame 240 by the elastic member 220 and the elastic member 230. In detail, the elastic member 220 is connected to the upper surface of the holder 210 and the upper surface of the frame 240, and the elastic member 230 is connected to the lower surface of the holder 210 and the lower surface of the frame 240. Therefore, the holder 210 can be movably hung in the frame 240.

The supporting members 250 are extended along the incident direction D1, and the opposite ends of each supporting member 250 are connected to the elastic member 220 and the base 120 respectively. Therefore, the first movable portion 200 can be movably connected to the first fixed portion 100. For example, each of the supporting members 250 can be a suspension wire that is elastic, but it is not limited thereto.

The first driving assembly 300 can drive the first movable portion 200 to move relative to the first fixed portion 100. In particular, the first driving assembly 300 is configured to drive the frame 240 to move along the X-axis and/or the Y-axis relative to the first fixed portion 100, so that the holder 210 and the first optical member O1 that are connected to the frame 240 can be driven to move along the X-axis and/or the Y-axis, and the purpose of the optical image stabilization (OIS) can be achieved.

The first driving assembly 300 includes a plurality of electromagnetic driving members 311, 312, and 313 and a plurality of electromagnetic driving members 321, 322, and 323. The electromagnetic driving members 311, 312, and 313 are disposed on the base 120. The electromagnetic driving member 311 is situated at the second side M12 of the first module M1, the electromagnetic driving members 312 and 313 are situated between the first side M11 and the second side M12, and the second opening 121 of the base 120 is situated between the electromagnetic driving member 312 and the electromagnetic driving member 313. The electromagnetic driving members 321, 322, and 323 are disposed on the frame 240, and the positions of the electromagnetic driving members 321, 322, and 323 respectively correspond to the positions of the electromagnetic driving members 311, 312, and 313.

When current flow through the electromagnetic driving member 311, the electromagnetic effect between the electromagnetic driving member 311 and the electromagnetic driving member 321 can provide driving force to push the frame 240 to move relative to the first fixed portion 100 along the Y-axis. When current flow through the electromagnetic driving members 312 and 313, the electromagnetic effect between the electromagnetic driving member 312 and the electromagnetic driving member 322 and the electromagnetic effect between the electromagnetic driving member 313 and the electromagnetic driving member 323 can provide driving force to push the frame 240 to move relative to the first fixed portion 100 along the X-axis.

For example, each of the electromagnetic driving members 311, 312, and 313 can be a coil, and each of the electromagnetic driving members 321, 322 and 323 can be a magnet, but it is not limited thereto. In some embodiments, each of the electromagnetic driving members 311, 312, and 313 can be a magnet, and each of the electromagnetic driving members 321, 322 and 323 can be a coil.

It should be noted that, in this embodiment, as viewed along the first direction D2, at least a portion of the first driving assembly 300 and at least a portion of the base 120 overlap with the second optical member O2 in the second module M2. As view along a second direction D3 that is perpendicular to the incident direction D1 and the first direction D2, at least a portion of the first driving assembly 300 and at least a portion of the base overlap with the second optical member O2 in the second module M2, that is, at least a portion of the electromagnetic driving members 311, 312, and 313 overlaps with the second optical member O2, and at least a portion of the supporting members 250 overlaps with the second optical member O2. Therefore, the thickness of the optical component 11 in the Z-axis can be reduced, and the miniaturization of the optical system 10 is facilitated. The first direction D2 is not parallel to the incident direction D1. For example, the first direction D2 can be substantially perpendicular to the incident direction D1, but it is not limited thereto.

Moreover, in this embodiment, the optical component 11 can further includes a counterweight member W that is disposed on the frame 240 and situated at the first side M11 of the first module M1. The weight of the counterweight member W can be substantially the same as the weight of the electromagnetic driving member 321. Therefore, the frame 240 can be prevented from tilting when the first driving assembly 300 drives the frame 240 to move.

The first sensing assembly 400 includes a sensing member 410 and a sensing member 420. The sensing member 410 and the sensing member 420 are disposed on the base 120, and are respectively surrounded by the electromagnetic driving member 311 and the electromagnetic driving member 312. The sensing member 410 can obtain the position of the first movable portion 200 relative to the first fixed portion 100 in the Y-axis by detecting the movement of the electromagnetic driving member 321. The sensing member 420 can obtain the position of the first movable portion 200 relative to the first fixed portion 100 in the X-axis by detecting the movement of the electromagnetic driving member 322. For example, each of the sensing members 410 and 420 can be a Hall sensor, a magnetoresistance effect sensor (MR sensor), a giant magnetoresistance effect sensor (GMR sensor), a tunneling magnetoresistance effect sensor (TMR sensor), or a fluxgate sensor, but it is not limited thereto.

The second driving assembly 500 includes a driving coil 510 disposed on the holder 210, and the driving coil 510 is adjacent to the electromagnetic driving members 321, 322, and 323. When current flow through the driving coil 510, the electromagnetic effect between the driving coil 510 and the electromagnetic driving members 321, 322, and 323 can provide driving force to push the holder 210 to move relative to the frame 240 along the Z-axis. The first optical member O1 on the holder 210 can move along the Z-axis accordingly, therefore, the purpose of zooming or focusing can be achieved.

The second sensing assembly 600 includes a sensing member 610 and a sensing object 620. The sensing member 610 and the sensing object 620 are respectively disposed on the holder 210 and the frame 240, and the positions of the sensing member 610 and the sensing object 620 correspond to each other. The sensing member 610 can obtain the position of the holder 210 and the first optical member O1 disposed thereon relative to the frame 240 in the Z-axis by detecting the relative movement between the sensing member 610 and the sensing object 620. For example, the sensing member 610 can include a Hall sensor, a magnetoresistance effect sensor, a giant magnetoresistance effect sensor, a tunneling magnetoresistance effect sensor, or a fluxgate sensor, and the sensing object 620 can include a magnet, but it is not limited thereto. In some embodiments, the sensing member 610 can be disposed on the frame 240, and the sensing object 60 can be disposed on the holder 210.

It should be noted that, in this embodiment, the sensing member 610 disposed on the holder 210 is not covered by the driving coil 510. That is, the driving coil 510 is not disposed between the sensing member 610 and the sensing object 620. Thus, the sensing accuracy of the sensing member 610 can be ensured.

Figure 5:
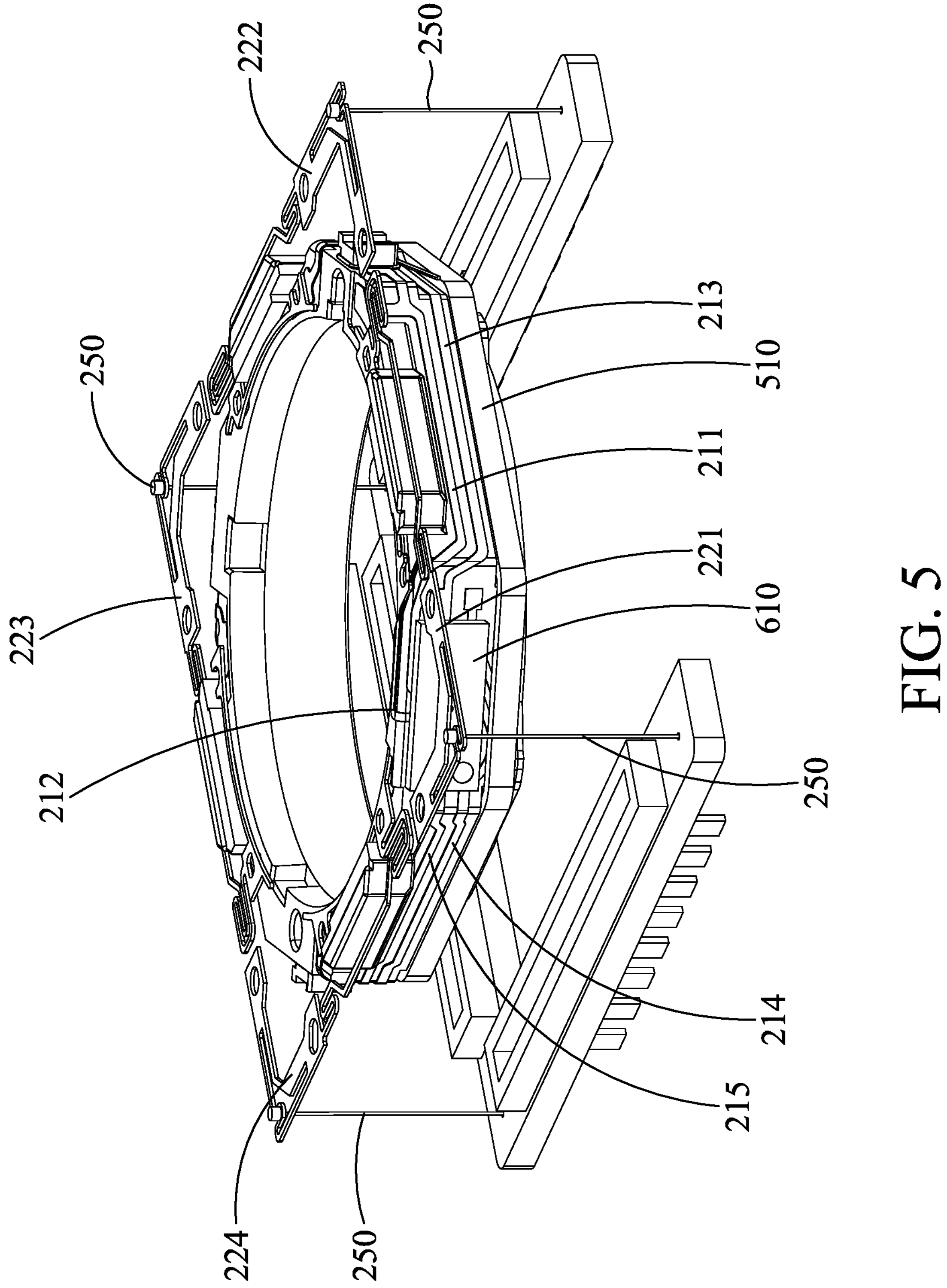
FIG. 5 is a schematic diagram of the base, the elastic member, the holder, the supporting members, and the sensing member according to an embodiment of the invention.

As shown in FIG. 2, FIG. 4, and FIG. 5, in this embodiment, the sensing member 610 is an all-in-one driver IC, the first movable portion 200 includes four supporting members 250, and the elastic member 220 includes four sections 221, 222, 223, and 224. One contact of the sensing member 610 can be electrically connected to the driving coil 510 via the circuit 221 on the holder 210, and other four contacts of the sensing member 610 can be electrically connected to four sections 221, 222, 223, and 224 of the elastic member 220 respectively via the circuits 212, 213, 214, and 215 on the holder 210. Four sections 221, 222, 223, and 224 of the elastic member 220 can be connected to four supporting members 250 respectively, and electrically connected to the wiring lines in the base 120 via the supporting members 250. The wiring lines in the base 120 can be electrically connected to a first circuit assembly C1 that is situated at the lateral side of the first module M1. The first circuit assembly C1 is configured to connect an external circuit in the electronic device 20.

Referring to FIG. 2 and FIG. 3, the second module M2 can include a second fixed portion 700, a second movable portion 800, a third driving assembly 900, and the second optical member O2. The second fixed portion 700 is fixedly connected to the base 120 of the first fixed portion 100, and the second optical member O2 is affixed to the second fixed portion 700 and corresponds to the first optical member O1. Thus, as viewed along the incident direction D1 of the light L, the first optical member O1 and the second optical member O2 overlap with each other. After the external light L passes through the first optical member O1, it can enter the second optical member O2 along the incident direction D1. The second optical member O2 can change the moving direction of the light L to guide the light L to the image sensor S. For example, the second optical member O2 can be a prism or a mirror, but it is not limited thereto.

In this embodiment, the second optical member O2 has a parallelogram cross-section, so that the light L can be reflected twice in the second optical member O2 and then reach the image sensor S. In some embodiments, the second optical member O2 can include other suitable shape cross-section to let the light L being reflected more than twice, so as to increase the length of the light path of the optical component 11.

A protruding portion 702 can be formed on the outer surface 701 of the second fixed portion 700 that is adjacent to the second side M12 of the first module M1, and the base 120 of the first module M1 can be in contact with the top surface of the protruding portion 702. Therefore, the second fixed portion 700 can further support the base 120 of the first module M1, and the reliability of the optical component 11 of the optical system 10 can be enhanced.

Moreover, in the X-axis, the width W1 of the section 710 of the second fixed portion 700 that is connected to the first module M1 is less than the width W2 of the section 720 of the second fixed portion 700 that is not connected to the first module M1. Therefore, a first ducking portion 730 and a second ducking portion 740 can be formed on the opposite sides of the first module M1, wherein each of the first ducking portion 730 and the second ducking portion 740 has a depression structure. The first circuit assembly C1 of the first module M1 can be accommodated in the first docking portion 730, and the optical module in the optical component 12 (a third module) can be accommodated in the second docking portion 740, so that the miniaturization of the optical system 10 can be facilitated. The optical module in the optical component 12 (the third module) can include the structure similar to the first module M1 of the optical component 11, but it is not limited thereto.

Referring to FIG. 2 and FIG. 3, the second movable portion 800 can be movably connected to the second fixed portion 700, and the image sensor S is disposed on the second movable portion 800. The third driving assembly 900 includes at least one electromagnetic driving member 910 and at least one electromagnetic driving member 920. The electromagnetic driving member 910 and the electromagnetic driving member 920 are respectively disposed on the second fixed portion 700 and the second movable portion 800, and correspond to each other.

For example, the electromagnetic driving member 910 can be a magnet, and the electromagnetic driving member 920 can be a coil. When current flow through the electromagnetic driving member 920, the electromagnetic effect between the electromagnetic driving member 910 and the electromagnetic driving member 920 can provide driving force to push the second movable portion 800 to move or rotate relative to the second fixed portion 700. The image sensor S can be move or rotate accordingly, therefore, the purpose of the optical image stabilization can be achieved. In some embodiments, the electromagnetic driving member 910 can be a coil, and the electromagnetic driving member 910 can be a magnet.

A second circuit assembly C2 can be disposed on the outer surface of the second fixed portion 700. The second circuit assembly C2 can penetrate the second fixed portion 700 and enter the internal of the second module M2 to electrically connect the image sensor S and the electromagnetic driving member 920 (or the electromagnetic driving member 910). Moreover, the second circuit assembly C2 can further include an access line C21 extending along the outer surface of the second fixed portion 700 to the first circuit assembly C1 to electrically connect the first circuit assembly C1. Therefore, the image sensor S and the electromagnetic driving member 920 (or the electromagnetic driving member 910) can be electrically connected to the external circuit in the electronic device 20 via the first circuit assembly C1 and the second circuit assembly C2. When the optical system 10 is disposed in the electronic device 20, the first module M1 and the second module M2 can be electrically connected to the external circuit in the electronic device 20 at the same place, so that the manufacture of the optical system 10 can be facilitated.

Moreover, since the first circuit assembly C1 is accommodated in the first docking portion 730, the access line C21 of the second circuit assembly C2 can be also accommodated in the first docking portion 730. The miniaturization of the optical system is facilitated.

In summary, an embodiment of the invention provides an optical system, including a first module configured to hold a first optical member. The first module includes a first movable portion, a first fixed portion, and a first driving assembly. The first movable portion is configured to connect the first optical member, and is movable relative to the first fixed portion. The first driving assembly is configured to drive the first movable portion to move relative to the first fixed portion.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical system, comprising:

a first module, configured to hold a first optical member, comprising:

a first fixed portion, comprising:

a case, having a first opening, wherein the first opening corresponds to a light; and a base, having a second opening, wherein the second opening corresponds to the light;

a first movable portion, configured to connect the first optical member, wherein the first movable portion is movable relative to the first fixed portion and comprises:

a holder, configured to connect the first optical member;

a frame, surrounding the holder;

an elastic member, connected to the holder and the frame; and a plurality of supporting members, connected to the elastic member and the base, wherein the elastic member has a plurality of sections separate from each other, and the sections are one-on-one connected to the supporting members;

a first driving assembly, configured to drive the first movable portion to move relative to the first fixed portion; and a second module, configured to receive a light leaving the first module and comprises a second optical member, wherein the second optical member is configured to adjust a moving direction of the light from an incident direction to a first direction, wherein as viewed along the first direction, at least a portion of the first driving assembly overlaps the second optical member, wherein as viewed along a second direction that is perpendicular to the incident direction and the first direction, at least a portion of the first driving assembly overlaps the second optical member.

2. The optical system as claimed in claim 1, wherein the base has a C-shaped structure, and a receiving portion configured to receive at least a portion of the second module is formed at a notch of the C-shaped structure.

3. The optical system as claimed in claim 2, wherein the receiving portion is configured to receive at least a portion of the second optical member.

4. The optical system as claimed in claim 3, wherein as viewed along the first direction, at least a portion of the base overlaps the second optical member.

5. The optical system as claimed in claim 4, wherein the first movable portion is movably connected to the base via at least one supporting member, and as viewed along the second direction, at least a portion of the supporting member overlaps the second optical member.

6. The optical system as claimed in claim 3, wherein as viewed along the incident direction, the first optical member and the second optical member overlap.

7. The optical system as claimed in claim 2, wherein as viewed along the incident direction, the first module comprises a polygonal structure, and the polygonal structure has a first side and a second side opposite each other, wherein the receiving portion is situated at the first side, and the receiving portion communicates with the second opening.

8. The optical system as claimed in claim 7, wherein the optical system further comprises an image sensor configured to receive the light leaving the second module, and a distance between the first side and the image sensor is less than a distance between the second side and the image sensor.

9. The optical system as claimed in claim 7, wherein the second module has an outer surface and a protruding portion, the outer surface is adjacent to the second side, and the protruding portion protrudes from the outer surface, wherein the base is in contact with a top surface of the protruding portion.

10. The optical system as claimed in claim 7, wherein the first driving assembly comprises an electromagnetic driving member, the first module further comprises a counterweight member, and the electromagnetic driving member and the counterweight member are disposed on the first movable portion, wherein the counterweight member is situated at the first side, the electromagnetic driving member is situated at the second side, and a weight of the counterweight member is substantially the same as a weight of the electromagnetic driving member.

11. The optical system as claimed in claim 2, wherein the optical system further comprises an image sensor configured to receive the light leaving the second module, wherein as viewed along the incident direction, the first optical member is separate from the image sensor.

12. The optical system as claimed in claim 1, wherein the second module comprises:

a second fixed portion, fixedly connected to the base; and a second circuit assembly, configured to electrically connect an external circuit, wherein the second circuit assembly is electrically connected to a first circuit assembly of the first module.

13. The optical system as claimed in claim 12, wherein the second fixed portion comprises a first docking portion, and the first docking portion has a depression structure, wherein an access line of the second circuit assembly is disposed in the first docking portion.

14. The optical system as claimed in claim 13, wherein the second fixed portion further comprises a second docking portion, the second docking portion has a depression structure, and the first docking portion and the second docking portion are formed on opposite sides of the second fixed portion, wherein the optical system further comprises a third module disposed in the second docking portion.

15. The optical system as claimed in claim 1, wherein the first driving assembly comprises a sensing member disposed on the holder, and the sensing member is electrically connected to the sections via different circuits on the holder.

16. The optical system as claimed in claim 15, wherein the first driving assembly further comprises a sensing object disposed on the frame and corresponding to the sensing member, and the optical system further comprises a second driving assembly disposed on the holder, wherein the second driving assembly is not disposed between the sensing member and the sensing object.

* * * * *